(12) United States Patent
Olkkonen et al.

(10) Patent No.: US 11,391,943 B2
(45) Date of Patent: Jul. 19, 2022

(54) DIFFRACTIVE DISPLAY, LIGHTGUIDE ELEMENT AND PROJECTOR THEREFOR, AND METHOD FOR DISPLAYING IMAGE

(71) Applicant: Dispelix Oy, Espoo (FI)

(72) Inventors: Juuso Olkkonen, Espoo (FI); Mika Aikio, Espoo (FI); Antti Sunnari, Espoo (FI)

(73) Assignee: Dispelix Oy, Espoo (FI)

( * ) Notice: Subject to any disclaimer, the term of this patent is extended or adjusted under 35 U.S.C. 154(b) by 426 days.

(21) Appl. No.: 16/610,925

(22) PCT Filed: May 8, 2018

(86) PCT No.: PCT/FI2018/050341
§ 371 (c)(1),
(2) Date: Nov. 5, 2019

(87) PCT Pub. No.: WO2018/206848
PCT Pub. Date: Nov. 15, 2018

(65) Prior Publication Data
US 2020/0081246 A1 Mar. 12, 2020

(30) Foreign Application Priority Data
May 8, 2017 (FI) ..................................... 20175413

(51) Int. Cl.
*G02B 27/00* (2006.01)
*G02B 5/18* (2006.01)
(Continued)

(52) U.S. Cl.
CPC ....... *G02B 27/0081* (2013.01); *G02B 5/1823* (2013.01); *G02B 27/4272* (2013.01); *G02B 27/0172* (2013.01)

(58) Field of Classification Search
CPC ........ G02B 2027/0123; G02B 27/0081; G02B 27/0172; G02B 27/4272; G02B 5/1823; G02B 5/18; G02B 5/1819
See application file for complete search history.

(56) References Cited

U.S. PATENT DOCUMENTS 7,613,373 B1  11/2009 DeJong
8,160,411 B2   4/2012 Levola et al.
(Continued)

FOREIGN PATENT DOCUMENTS

CN   101589326 A   11/2009
CN   101589326 A   11/2009
(Continued)

*Primary Examiner* — Joseph P Martinez
*Assistant Examiner* — Vipin Patel
(74) *Attorney, Agent, or Firm* — Laine IP Oy (57) ABSTRACT

The invention concerns a multi-pupil lightguide element, a diffractive personal display, multi-pupil projector, a method for displaying an image and a use. The element comprises lightguide means, diffractive in-coupling means for coupling an image directed to the in-coupling means into the lightguide means, and diffractive out-coupling means for coupling said image out of the lightguide means. According to the invention, the diffractive in-coupling means comprise at least two in-coupling gratings laterally displaced from each other on said lightguide means for receiving segments of said image, and the diffractive out-coupling means is optically associated with said at least two in-coupling gratings for reproducing said image from said image segments. The invention allows for expanding the field-of-view of near-to-eye displays, for example.

22 Claims, 6 Drawing Sheets

(51) Int. Cl.
*G02B 27/42* (2006.01)
*G02B 27/01* (2006.01)

(56) References Cited

U.S. PATENT DOCUMENTS

| | | |
|---|---|---|
| 9,244,281 B1 | 1/2016 | Zimmerman et al. |
| 2004/0207823 A1 | 10/2004 | Alasaarela et al. |
| 2006/0132914 A1 | 6/2006 | Weiss et al. |
| 2010/0296163 A1* | 11/2010 | Saarikko .............. G02B 5/1814 359/569 |
| 2010/0321781 A1* | 12/2010 | Levola ............... G02B 27/4272 359/569 |
| 2011/0242670 A1 | 10/2011 | Simmonds |
| 2013/0314789 A1 | 11/2013 | Saarikko et al. |
| 2013/0322810 A1 | 12/2013 | Robbins et al. |
| 2014/0218801 A1 | 8/2014 | Simmonds et al. |
| 2016/0231478 A1 | 8/2016 | Kostamo |
| 2016/0327789 A1 | 11/2016 | Klug et al. |
| 2017/0019601 A1 | 1/2017 | Sumioka |

FOREIGN PATENT DOCUMENTS

| | | |
|---|---|---|
| CN | 104350411 A | 2/2015 |
| EP | 3423877 A1 | 1/2019 |
| JP | 2010224479 A | 10/2010 |
| JP | 2012003232 A | 1/2012 |
| JP | 2019508743 A | 3/2019 |
| WO | WO2014091200 A1 | 6/2014 |
| WO | WO2016130357 A1 | 8/2016 |
| WO | WO2017044873 A1 | 3/2017 |
| WO | WO2017151467 A1 | 9/2017 |
| WO | WO2017189268 A1 | 11/2017 |

\* cited by examiner

DIFFRACTIVE DISPLAY, LIGHTGUIDE ELEMENT AND PROJECTOR THEREFOR, AND METHOD FOR DISPLAYING IMAGE

FIELD OF THE INVENTION

The invention relates to diffractive display technology used in personal microdisplays, such as near-to-eye displays (NEDs) or other head mounted displays (HMDs). In particular, the invention relates to waveguides used in augmented reality (AR) NEDs or HMDs.

BACKGROUND OF THE INVENTION

The maximum field of view (FOV) of a single lightguide with 2D exit pupil expansion (EPE) depends on the lightguide refractive and the wavelength band of projected light. When wavelength band is 460-630 nm and lightguide refractive index is 2.0, the maximum FOV is around 33-35 degrees. To increase FOV, typical approach is to use multiple lightguides. As conventional microdisplay projectors produce only a single exit pupil, the in-coupling gratings of the lightguides are typically laterally coincident and stacked on top of each other. With stacked in-couplers, the in-coupling process is not well controlled. For example, the first lightguide supports entire FOV with blue wavelengths while with red wavelengths only a small part of FOV is in-coupled into the lightguide. This means that the entire lightguide stack needs to be optimized as a whole, which makes it cumbersome and time consuming. In addition, when light propagates through the in-couplers with different periods, the back diffracted light can couple to preceding lightguides and cause ghost images.

Some conventional lightguides utilize three different light guides to obtain red, green and blue image channels and are capable of achieving a FOV of approximately 35 degrees. These lightguides have the drawback of being limited in resolution and/or in wavelength band.

On the other hand, there are other kinds of optical systems, i.e. non-waveguide-based systems, that are capable of providing a larger FOV, but they generally have drawbacks compared to waveguides, usually with respect to the size of the system. Thus, these solutions are not optimal for AR systems, in which small size is desired.

Also single-channel large-FOV waveguide-based solutions are available, but their obvious drawback is in their limitation to produce colors.

US 2014/218801 discloses a color projection display wherein a first range of file angles and second range of field angles are coupled into and guided in different waveguide layers with in-coupling gratings. The waveguide layers have the same or mirrored geometry, resulting in the in-coupling gratings being aligned with each other or positioned far from each, respectively. These arrangements are not optimal as concerns optical coupling efficiency and quality and size requirements. US 2006/132914 discloses another known waveguide arrangement with two in-coupling gratings in some embodiments thereof.

Thus, there is a need for improvements in microdisplay technology with respect to the capability to achieve a large FOV combined with small device size and, preferably, color reproduction.

SUMMARY OF THE INVENTION

It is an aim of the invention to solve at least some of the abovementioned problems and to provide novel solutions for expanding the FOV of personal displays. Particular aims include providing an extended-FOV lightguide element and extended FOV image projector, which can be combined to form a functional personal display.

Secondary aims are to provide technology that allows decreasing device size, at least in proportion to the FOV achievable, and technology that allows for full color reproduction.

It is also an aim to provide diffractive waveguide technology whose manufacturing tolerances are looser than in traditional technology that involves wavelength splitting.

The invention is based on splitting the FOV of the total image into partial FOVs (image segments) that are directed to a diffractive waveguide element through at least two different pupils, and designing the element in such a way that the partial FOVs are recombined into the total image viewable by a user. To implement this, a novel multi-pupil waveguide element and a novel multi-pupil projector as described below are provided.

The multi-pupil lightguide element for a diffractive personal display according to the invention comprises lightguide means, in particular a stack of at least two lightguides. In addition, there is provided diffractive in-coupling means for coupling an image directed to the in-coupling means into the lightguide means, and diffractive out-coupling means for coupling said image out of the lightguide means. According to the invention, the diffractive in-coupling means comprise at least two in-coupling gratings laterally displaced from each other on said lightguide means, for receiving segments of said image. Further, the diffractive out-coupling means is optically connected with the in-coupling gratings so as to reproduce the image from the image segments.

In particular, the diffractive out-coupling means may comprise at least two out-coupling gratings laterally overlapping each other on the lightguide means. The at least two out-coupling gratings are optically associated with said at least two in-coupling gratings, respectively, for reproducing said image from said image segments. The optical association can be implemented by incorporating the gratings on different lightguide layers, which together form said lightguide means, and typically by additionally providing exit pupil expander gratings which optically connect the in-couplers with the respective out-couplers in the different layers.

The present personal display device comprises a multi-pupil lightguide element as herein described for producing an image viewable by the naked eye on the out-coupling means thereof, and a multi-pupil projector capable of projecting at least two different image segments of said image on said at least two in-coupling gratings. In particular, the segments are guided on at least partially different lateral positions of the lightguide element so that the FOV of the total image formed by device is larger than the FOV of any of the segments alone.

In one aspect thereof, the invention also concerns a multi-pupil projector for a diffractive personal display, the projector comprising at least one display element for displaying an image, at least two exit pupils, and optical means for projecting at least two different segments of said image to said at least two exit pupils, respectively. The display element further comprises a non-polarized light source and means for utilizing two different polarization states of said light source for projecting said image segments to said exit pupils.

The method according to the invention for displaying image on a personal display device comprises projecting at least two different partial image segments of a total image on at least two diffractive in-coupling gratings laterally displaced from each other on a lightguide means, the in-coupling gratings coupling said image segments to the lightguide means, and guiding the image segments to diffractive out-coupling means, such as at least two different diffractive out-coupling gratings, respectively, which are laterally overlapping each other on said lightguide means, for reproducing said total image from said image segments.

Finally, the present use comprises using of multiple laterally displaced in-coupling gratings in a lightguide-based display element of a personal display for expanding the field of view of the personal display.

More specifically, the invention is characterized by what is stated in the independent claims.

The invention offers significant benefits over the prior art. By using different image segments of the projector and/or and guiding them to and in the display element as defined above, the FOV of the waveguide is split instead of splitting the wavelength band. Thus, the total FOV can be increased significantly. This is because each exit pupil of the multi-pupil projector contains a part of the entire FOV. The entire FOV is then obtained using lightguides whose exit pupils (out-coupling gratings) are spatially overlapping. Also, because the exit pupils of the projector are spatially separated, it is possible to use spatially separated, i.e. displaced, in-coupling gratings in the lightguides. With this approach, there is no risk of ghost images caused by the back diffracted light and each lightguide contains a well-defined light spectrum with a well-defined FOV, which makes the lightguide optimization process easy and straightforward, in particular compared with wavelength band splitting based approaches.

Splitting the FOV to two optical paths in the system also allows for decreasing the size of the projector compared with full-FOV projectors, because its optical components, like beam splitters and illumination optics can be smaller.

Further, LCOS based multi-pupil projectors can be designed so that both polarization states of incident illumination are utilized, which makes it more energy efficient than conventional projectors that operate only with a single polarization state.

The dependent claims are directed to selected embodiments of the invention.

As concerns the lightguide element, in some embodiments, the lightguide means comprise at least two lightguides stacked on top of each other. Each in-coupling grating and associated out-coupling grating is arranged on one of the waveguides, respectively, whereby light can propagate between via total internal reflections of the waveguide. Typically, planar or nearly planar waveguides are used.

In some embodiments, there are provided at least two exit pupil expander (EPE) gratings associated with the in-coupling gratings and out-coupling gratings, respectively, for extending the exit pupil of the element. The EPE gratings are arranged optically between the in- and out-coupling gratings, whereby their position, shape and grating line configuration, including orientation, is suitable to carry out exit pupil expansion. In some embodiments, an EPE is provided only for some in-coupling gratings.

In some embodiments, the in-coupling gratings and exit pupil expander gratings are located such that a first in-coupling grating associated with a first exit pupil expander laterally overlaps with a second exit pupil expander associated with a second in-coupling grating. Thus, if accessed from one side of the lightguide stack only, for entering one of the in-coupling gratings, light must pass the EPE grating associated with the other in-coupling grating. The other in-coupling grating is directly accessible.

In some embodiments, the element comprises a first in-coupling grating and associated exit pupil expander grating pair and a second in-coupling grating and associated exit pupil expander grating pair, which is essentially mirror-symmetrically positioned on the lightguide means with respect to the first pair along at least one symmetry axis. Typically, the pairs are manufactured on different lightguides and then stacked so that the symmetry condition is fulfilled.

In some embodiments, the exit pupil expander gratings associated with different in-coupling gratings and out-coupling gratings are essentially aligned with each other. In this variation, the in-coupling gratings can be positioned at different distances from respective EPE gratings so that they are laterally displaced but still optically coupled with the EPEs.

In some embodiments, the element is adapted to reproduce an image with a larger field-of-view on the out-coupling means than the field-of-view of any of the image segments presented on the in-coupling gratings. Thus, the elements acts as a FOV expander.

In some embodiments, the out-coupling gratings comprise grating lines oriented in the horizontal direction. On the other hand, they can also be placed in the vertical direction, whereby some undesired optical effects can be avoided. Both configurations are exemplified later in this document.

As concerns the projector, in some embodiments the projector comprises a single display panel whose different zones are utilized for producing said different image segments. That is, no separate panels are needed for each separate segment (although separate panels can also be employed). In this case the projector is adapted to produce the image on the display panel such that the image segments are in a laterally shifted configuration in at least one lateral dimension of the display panel, the segments optionally being separated by a black separating zone for preventing cross-talk between the segments on projector optics and/or the multi-pupil lightguide element. The optical axes of imaging optics for each segment are also preferably laterally shifted so that the black separating zone remains in the fringe area of the optical plane.

In some embodiments, the projector comprises a plurality of display panels that are utilized for producing the different image segments. This embodiment is particularly suitable for lightguide element configurations where the in-coupling gratings of different image segments are located far from each other.

In some embodiments, differently polarized light is fed to the different exit pupils. Depending on the projector configuration and display technology involved, polarization can be carried out in the light source level, between the light source and the display panel, and/or between the display panel and exit pupils.

In some embodiments, the display element of the projector comprises a liquid crystal on silicon (LCOS) display panel or the like and an illumination system comprising at least two polarizing beam splitters arranged in sequence for utilizing two different polarization states of light for projecting said at least two different image segments. For example, the display element may comprise two successive beam splitters, such as beam splitter cubes or plates, having perpendicular polarization orientations. Alternatively, the optics may comprise two successive beam splitters, such as beam splitter cubes or plates, having the same polarization orientation and a half-wavelength waveplate arranged optically between the beam splitters.

When in operation, the different image segments produced by the projector and directed to the lightguide element carry a different field-of-view of the total image. In a typical configuration, the different image segments are guided on different lightguide layers stacked on top of each other and comprising the in-coupling gratings and out-coupling gratings, respectively. The total FOV formed by the stack is arranged to be larger than any of the partial FOVs carried by the segments.

Next, embodiments of the invention and advantages thereof are discussed in more details with reference to the attached drawings.

DETAILED DESCRIPTION OF EMBODIMENTS

Definitions

Gratings being "overlapping" means that at least some portions of the gratings are laterally aligned with each other in the lightguide means. Overlapping gratings may also be entirely aligned, i.e. have the same shape and positioned in the same location.

Gratings being "displaced" from each other means that they are not overlapping at least at portions thereof to which the image segments are projected.

"Multi-pupil projector" means an image source that is capable of presenting a plurality of image segments on a plurality of exit pupils thereof in a suitably collimated beam of light for a diffractive in-coupling grating.

Likewise, a "multi-pupil lightguide element" is an element having a plurality of in-coupling gratings capable of receiving such light beams for coupling the image segments to the lightguide means for guiding to the out-coupling gratings for recombination of the image and viewing.

"Lightguide means" refers in particular to a stack of diffractive lightguides adapted to in-couple, guide and out-couple the different image segments. However, other kinds of diffractive lightguide arrangements are not excluded in the present concept.

The term "personal display" refers in particular to NEDs and other kinds of HMDs, and HUDs (head-up displays).

Description of Selected Embodiments

In the following description, selected embodiments of a multi-pupil diffractive display element and a multi-pupil projector therefor are described. These components can be used to form a functional lightguide based diffractive NED. The described embodiments exemplify how the FOV of the projector can be divided into multiple parts such that each pupil contains one part of the entire FOV, and how a functional NED with full FOV is obtained by combining the FOV parts by lightguides whose exit pupils are spatially overlapping.

The description focuses on an implementation, where the image recombination is carried out using overlapping out-coupling gratings. However, solutions where the recombination is carried out in another way, for example using a single out-coupling grating and an optical combiner between the in-coupling gratings and the out-coupling grating, are not excluded.

Projector

In general, the projector comprises one or more display elements, at least two exit pupils and projection optics to guide different image segments displayed on the display panels to different exit pupils. In a multi-pupil projector, the image-presenting portion is divided into several parts for different image segments. Each display part has its own projection optics unit and an exit pupil. The exit pupils are filled with collimated light.

The display element(s) may comprise e.g. a liquid crystal display (LCD) panel(s), liquid crystal on silicon (LCOS) panel(s) or organic light emitting diode (OLED) panel(s), and also digital light processing (DLP) devices or digital micromirror devices (DMDs) may be employed. These are all referred to as "microdisplays".

The image to be displayed is presented either on a single microdisplay panel or on two or more separate microdisplay panels. If a single panel is used, different image segments are displayed on different sections of the panel, from which they are guided to different exit pupils of the projector with suitable optics. If a plurality of panels is used, the different segments are displayed on different panels and guided to different exit pupils of the projector with suitable optics. Using separate panels, the distance between the exit pupils can be varied more freely than with a single panel. On the other hand, one advantage of using a single display is that it is less sensitive for vibrations and more cost efficient.

Figure 1:
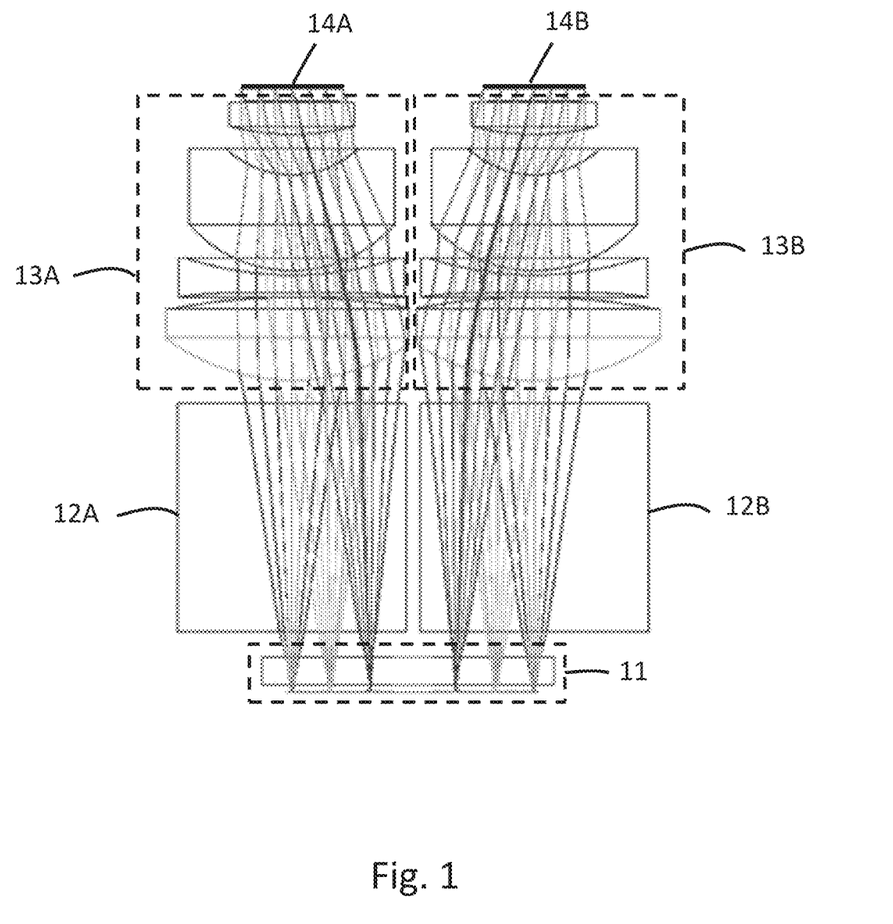
FIG. 1 illustrates in a cross-sectional view an optical arrangement of a projector suitable for use together with the lightguide element according to the invention.

FIG. 1 shows an example of the multi-pupil projector having two exit pupils 14A, 14B. The projector contains a microdisplay 11, such as a liquid crystal on silicon (LCOS) microdisplay, two polarizing beam splitters 12A, 12B, and illumination optics units 13A, 13B.

In general, a beam splitter cube which can be used as the polarizing beam splitter has the same height as the display width. When two cubes are used instead of one, the volume required by the cubes is significantly reduced.

Figure 2A:
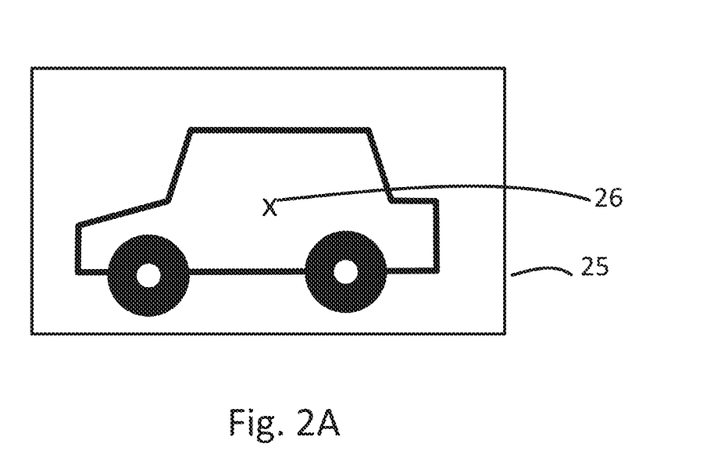
FIGS. 2A and 2B illustrate conventional centered and laterally shifted image positioning, respectively, on the display panel of the projector.
Figure 2B:
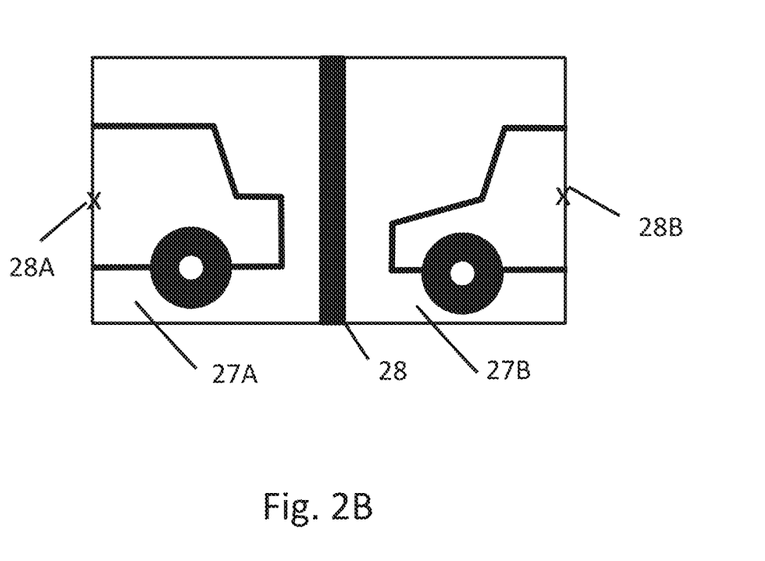

In single pupil projectors, the optical axis 26 is centered with the center point of the LCOS display. This is illustrated in FIG. 2A. When a dual pupil projector is implemented with a single LCOS, for example, it is preferred to have a black stripe 28 between the two display segments 27A, 27B as shown in FIG. 2B. This prevents cross-talk between the imaging optics units. To avoid a black stripe in the final image coming out from the projector, the optical axes of the imaging optics units 28A, 28B needs to be at side edges of the display, as shown in FIG. 2B. Then the black stripe in the LCOS display contributes to side regions of the final image, where the black stripe is not noticeable for the user. If a four-pupil solution is desired, the optical axes are moved to corner points of the microdisplay and instead of a black stripe, a black cross is used to isolate the four display segments. This kind of lateral shifting of the image at the panel in one or two dimensions therefore allows for utilizing a single microdisplay panel without undesired side-effects in the resulting image quality.

One advantage of a multi-pupil projector is that the projector unit can utilize both polarization states of the incident illumination. For example, light emitting diodes (LEDs) that are widely used in light engines of LCOS projectors produce randomly polarized where transverse electric (TE) and transverse magnetic (TM) polarizations are equally strong.

Thus, according to some embodiments, particularly suited for display element technologies utilizing a randomly polarized light source, one or more polarization-sensitive elements are used to increase the efficiency of the projector. For example, polarizing beam splitter cubes using different wire grid orientations or a polarization state conversion plate that rotates the polarization by 90 degrees can be employed between the light source and the display panel of the display element. These embodiments are best suitable for LCOS type displays. These solutions are discussed in detail below, although the same principles may be applied to other image production technologies and display technologies too.

Figure 3:
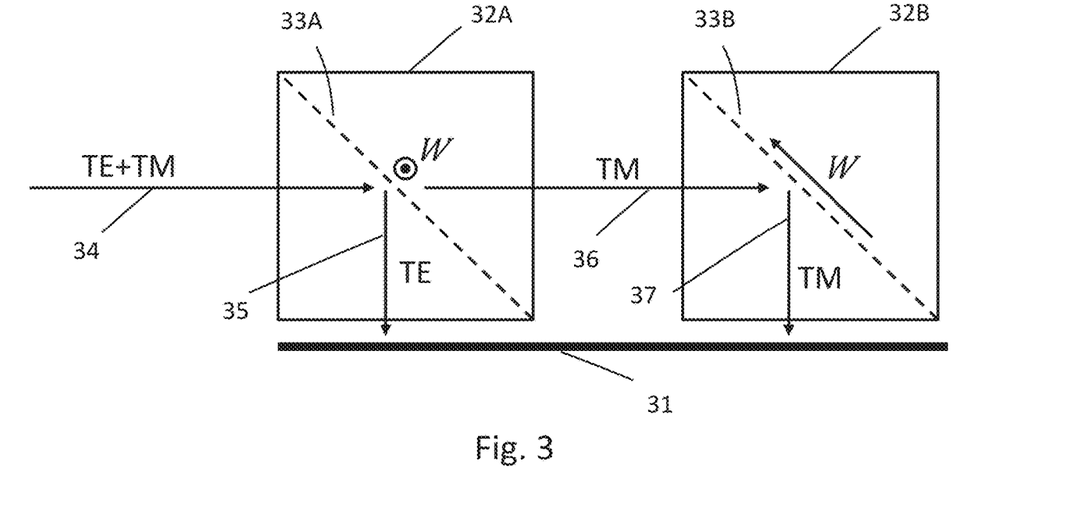
FIGS. 3 and 4 show in cross-sectional views two different embodiments for utilizing both polarization states of light for displaying an image on an LCOS display element.
Figure 4:
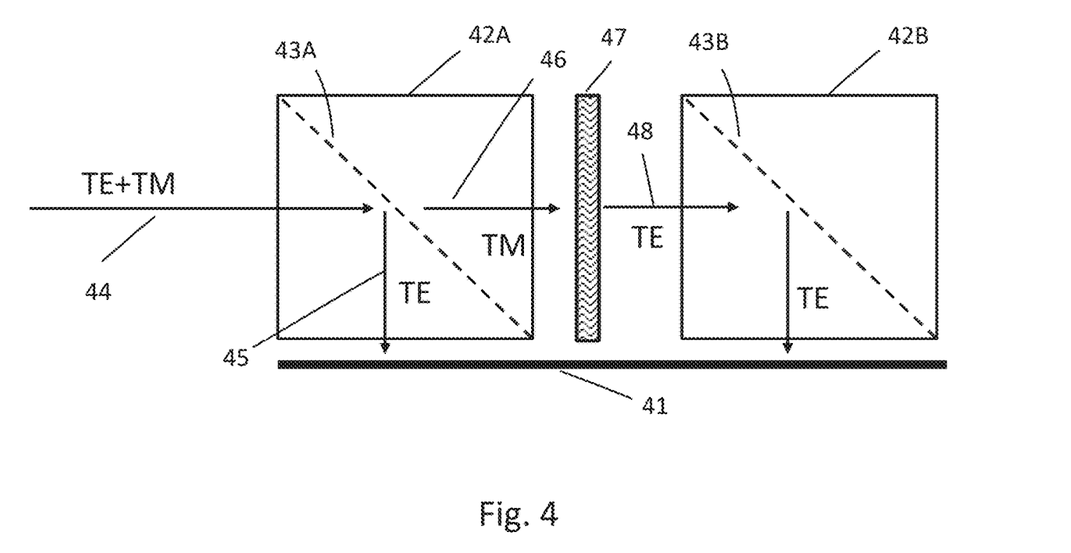

Two possible scenarios to illuminate LCOS displays with randomly polarized light are illustrated in FIGS. 3 and 4.

In FIG. 3, the projector contains two polarizing beam splitter cubes 32A, 32B whose wire grids 33A, 33B have a 90 deg orientation difference in respect of each other. The direction of wires in the wire grids is denoted by $\vec{W}$. When the incident light 34 hits the first wire grid 33A, a TE polarized part 35 of the incident light reflects towards the LCOS display 31. The TM polarized part 36 continues towards the second wire grid 33B and reflects from it towards the LCOS display 31.

In FIG. 4, the projector contains two identical polarizing beam splitter cubes 42A, 42B. When the incident light 44 hits the first wire grid polarizer 43A, the TE part 45 reflects towards the LCOS display 41. The TM part 46 continues towards a $\lambda\backslash 2$ waveplate 47 that turns the TM polarized light 46 into TE polarized 48. Next the light rays reflect from the wire grid polarizer 43B towards the LCOS display 41.

Instead of polarizing beam splitter cubes, also polarizing beam splitter plates can be used in the constructions of FIGS. 3 and 4.

Lightguide Element

Figure 5A:
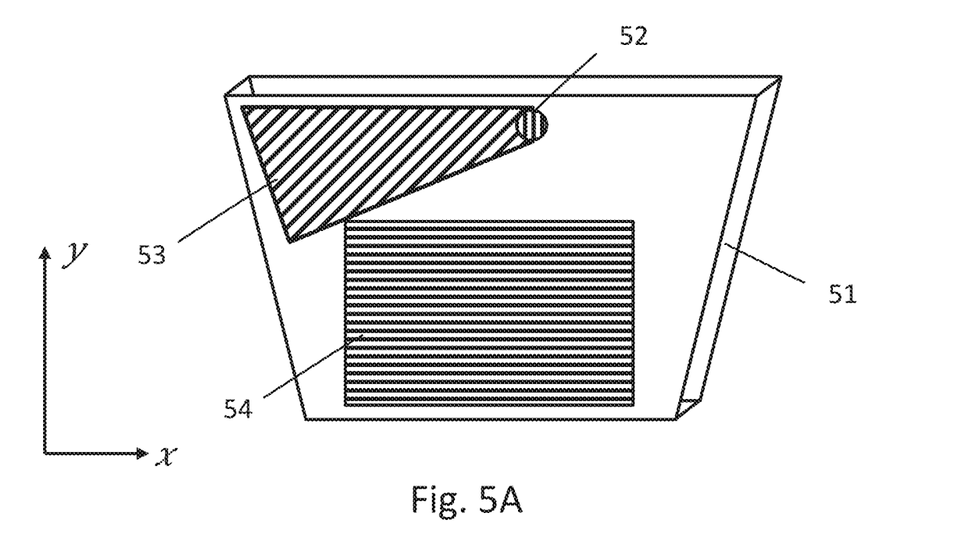
FIGS. 5A and 5B show one embodiment for arranging in-coupling, exit pupil expander and out-coupling gratings on lightguide layers of a lightguide stack.
Figure 5B:
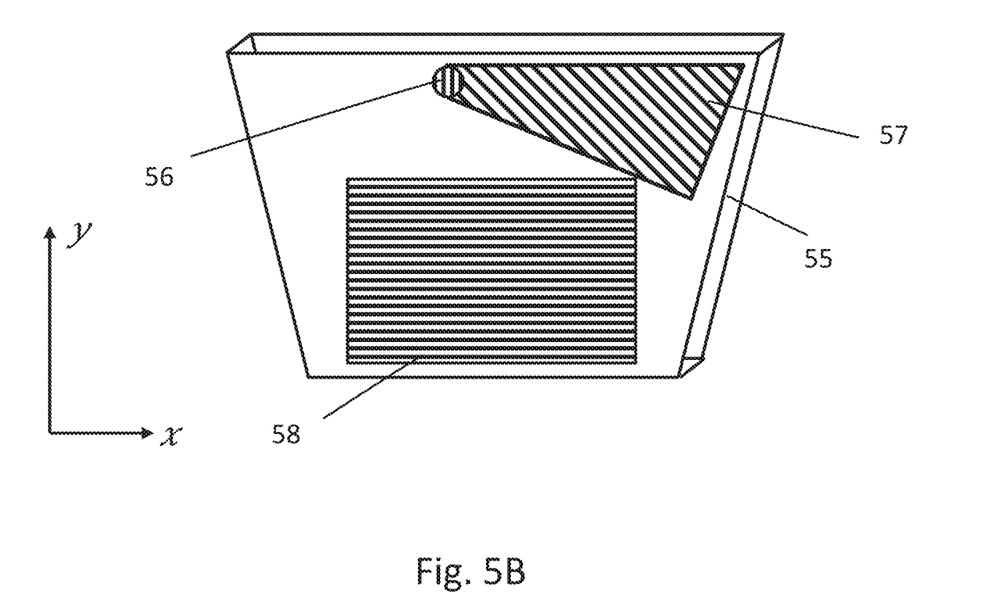

FIGS. 5A and 5B illustrate two lightguides 51, 55, respectively, that could be used with a dual pupil projector when stacked on top of each other. The lightguides 51, 55 contain in-coupling gratings 52, 56, exit pupil expansion gratings 53, 57, and out-coupling gratings 54, 58.

When the lightguides 51, 55 are stacked, the distance between the in-couplers 52, 56 in the x-direction is so small that the projector can be implemented with a single display. The in-coupler 52 of the first lightguide that is closer to the projector is illuminated directly without any obstacles between the projector and the in-coupler 52, while the in-coupler 56 of the second lightguide will be illuminated through the exit pupil expansion grating 53 of the first lightguide 51. Because of this, the exit pupil expander 53 may couple some light into the first lightguide 51 but this light will not be ever out-coupled by the out-coupling grating 54 and thus it will not be visible for the user. It only reduces the amount of light energy coupled into the second lightguide 55.

The in-coupling gratings 52, 56 are located adjacent to each other, typically located laterally central along the width (or height, depending on the configuration) of the lightguide means. Their distance can be e.g. less than 50% of the width of the out-coupling grating, for example e.g. 15 mm or less, such as 10 mm or less. "Laterally central" herein means within the centermost third of the element, when divided into three sections of equal width by two parallel lines.

Figure 6A:
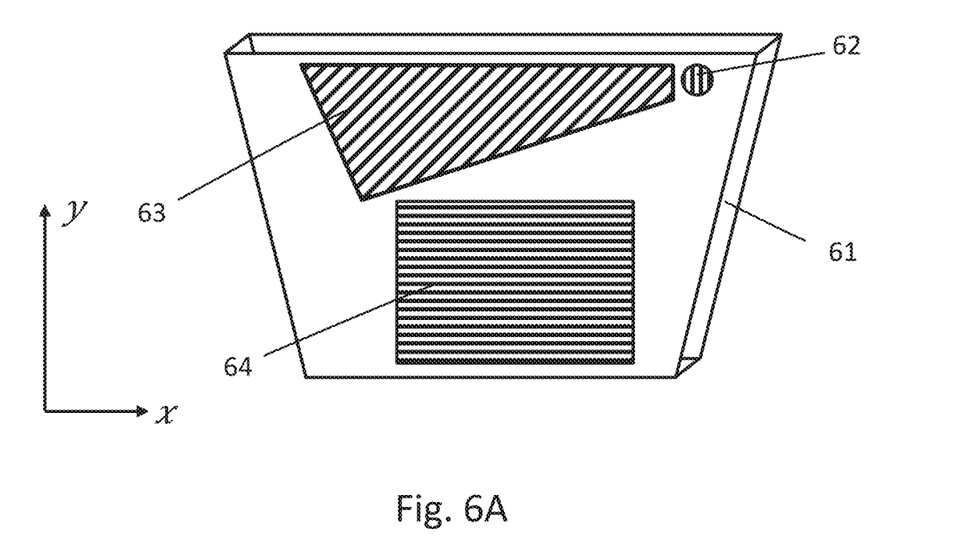
FIGS. 6A and 6B show another embodiment for arranging in-coupling, exit pupil expander and out-coupling gratings on lightguide layers of a lightguide stack.
Figure 6B:
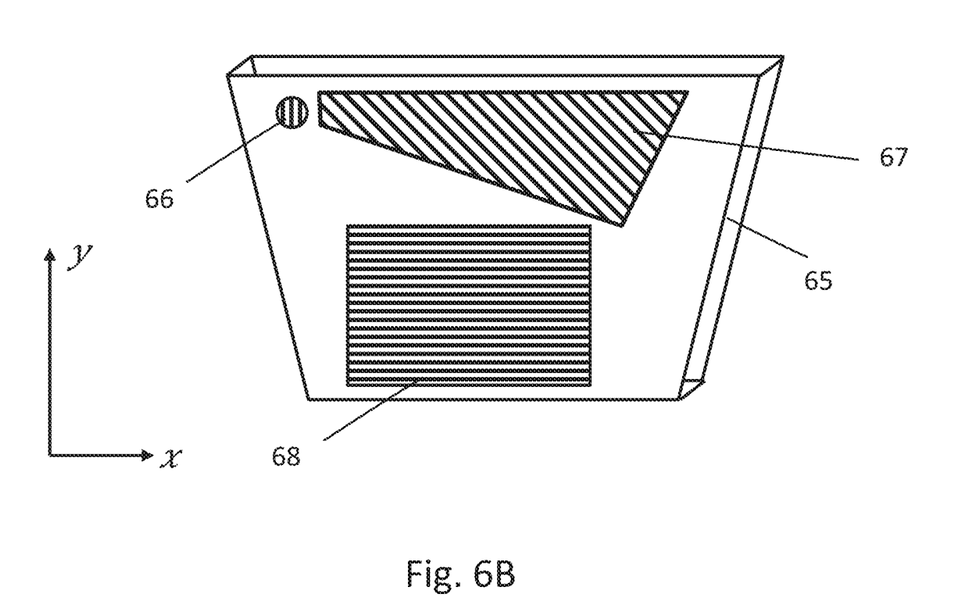

FIGS. 6A and 6B illustrate a variation where in-couplers 62, 66 of lightguides 61, 65, respectively, are very far away from each other in the x-direction. The lightguides also contain exit pupil expansion gratings 63, 67 and out-coupling gratings 64, 68.

As the in-coupling gratings 62, 66 are locate relatively far from each other, it is preferred to use this embodiment in combination with a projector that utilizes separate microdisplays for the respective image segments. "Far from each other" herein means that the in-coupling gratings are laterally separated by a distance, which is more than 50%, in particular more than 100%, of a corresponding dimension the out-coupling grating. In practice, this distance can be e.g. 15-50 mm, whereby the gratings may be located in the vicinity of opposite corners of the lightguide means.

The distance between the in-coupling gratings 62, 66 can be e.g. more than 50% of the width of the out-coupling grating, such as more than 15 mm, such as 20 mm or more. The distance can be more than the width of the out-coupling grating, as is the case in the example of FIGS. 6A/6B.

Common to the embodiments of FIGS. 5A, 5B/6A, 6B is that the exit pupil expansion gratings 53, 56/63, 67 extend to opposite directions form the in-coupling gratings such that they overlap with each other and the out-coupling gratings 54, 58/64, 68 are placed in relation to the in-coupling gratings 52, 56/62, 66 and the exit pupil expansion gratings 53, 57/63, 67 so that the diffracted light waves hit them and they together form the full FOV based on the partial FOVs targeted to the in-coupling gratings 54, 58/64, 68.

This constructions of FIGS. 5A/5B and 6A/6B enable total FOV of 55 degrees with 16:9 aspect ratio when light guide refractive index is 2.0 and the operational wavelength band of the display is 460-630 nm.

Figure 7A:
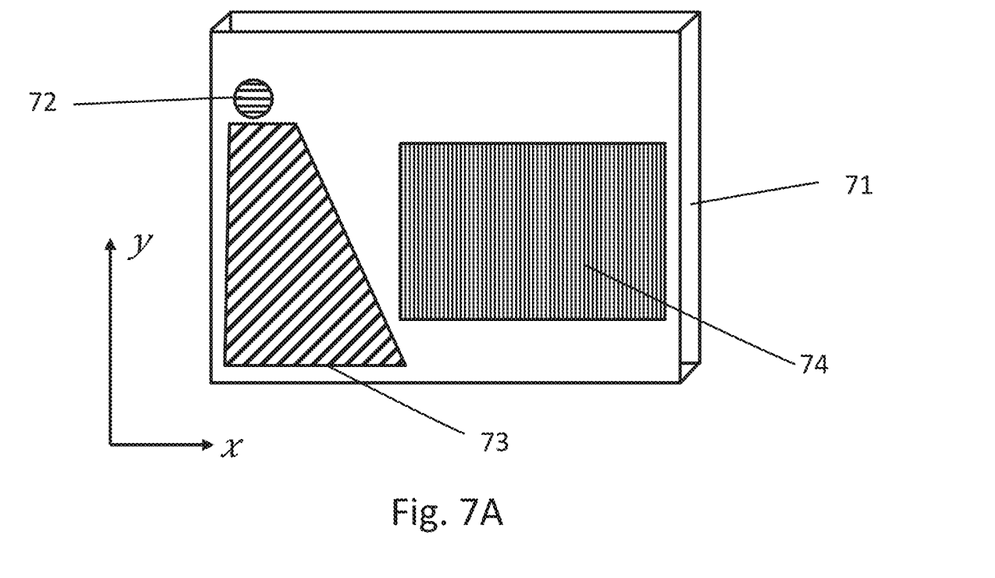
FIGS. 7A and 7B show still another embodiment for arranging in-coupling, exit pupil expander and out-coupling gratings on lightguide layers of a lightguide stack.
Figure 7B:
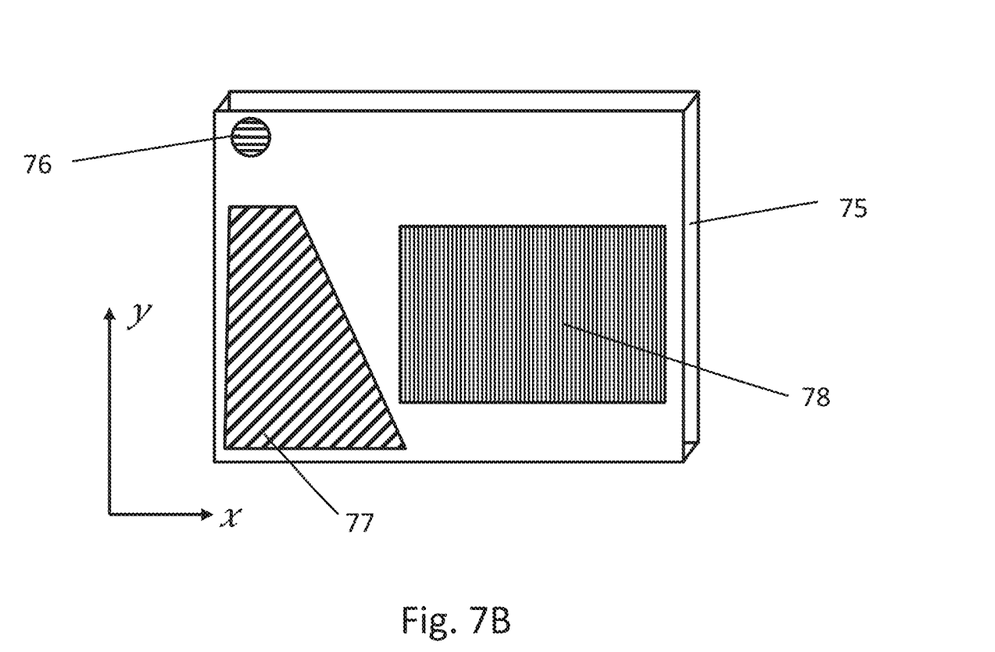

In FIG. 7, the in-couplers 72, 76 of lightguides 71, 75 are located in the same corner region (herein the top left corner) of the lightguides but displaced from each other. This configuration is particularly preferred in cases where the projector needs to be located for example in a temple of smart eyewear. "Corner region" herein means one quarter of the element, when divided with two perpendicular lines.

In addition, when the grating lines of the out-couplers 74, 78 are vertical, as in the illustrated example, the out-coupling gratings do not produce any strong, disturbing rainbow patters due to ambient light, contrary to what may happen when grating lines are horizontal. The exit pupil expanders 73, 77 can have various shapes depending how the ray paths leading from the in-coupler to the out-coupler have been designed.

Corner placement of in-couplers can be implemented also in the case of horizontal out-coupler grating lines like in FIGS. 5A, 5B/6A, 6B.

The lightguide layers which the gratings are manufactured on are preferably optically transparent. They may be made of glass or polymer. Transparent herein means transmittance higher than 50%, in particular higher than 95%. The gratings in each layer can be manufactured on the same side or different sides thereof. There may also be one or more intermediate layers or coatings in the stack, which have influence on the optical or mechanical properties thereof.

The period of the gratings herein discussed is typically 10 µm or less, in particular 1 µm or less, such as 200-800 nm.

Personal Display

One or more projectors and one or more lightguide elements of the above kind can be arranged into a suitable frame, in particular a wearable frame, so as to provide a functional personal display. In particular, there may be provided one projector and one lightguide element, for one eye only, or two projectors and lightguide elements, one for each eye, arranged into smart glasses, augmented reality or virtual reality glasses, or some other type of NED or HMD device. The present technology is, however, not usable only in NEDs and HMDs, but also in HUDs, for example.

The above description and drawings are focused on two-pupil solutions but it should be noted that in order to further expand the FOV of the display in one or two dimensions, the number of pupils can be larger than that, such as three, four or even more.

The invention claimed is:

1. A multi-pupil lightguide element for a diffractive personal display, comprising:
   lightguide means,
   diffractive in-coupling means for coupling an image directed to the in-coupling means into the lightguide means, and
   diffractive out-coupling means for coupling said image out of the lightguide means, wherein
   the diffractive in-coupling means comprise at least two in-coupling gratings laterally displaced from each other on said lightguide means for receiving segments of said image,
   the diffractive out-coupling means is optically associated with said at least two in-coupling gratings for reproducing said image from said image segments, and
   an exit pupil expander grating for each in-coupling grating, the exit pupil expander gratings being associated with and arranged optically between at least one of said in-coupling gratings and said out-coupling means, for extending the exit pupil of the element, wherein
said in-coupling gratings and exit pupil expander gratings are located such that a first in-coupling grating associated with a first exit pupil expander grating laterally overlaps with a second exit pupil expander grating associated with a second in-coupling grating.

2. The element according to claim 1, wherein the diffractive out-coupling means comprises at least two out-coupling gratings laterally overlapping each other on said lightguide means, the at least two out-coupling gratings being optically associated with said at least two in-coupling gratings, respectively, for reproducing said image from said image segments.

3. The element according to claim 1, wherein the lightguide means comprise at least two lightguides stacked on top of each other, said in-coupling gratings and said out-coupling means being arranged on said at least two waveguides, respectively.

4. The element according to claim 1, wherein said in-coupling gratings are laterally displaced with respect to said exit pupil expander gratings.

5. The element according to claim 1, wherein the element further comprises a first in-coupling grating and associated exit pupil expander grating pair and a second in-coupling grating and associated exit pupil expander grating pair, which is essentially mirror-symmetrically positioned on the lightguide means with respect to the first pair.

6. The element according to claim 1, wherein the exit pupil expander gratings associated with different in-coupling gratings and out-coupling gratings are essentially aligned with each other.

7. The element according to claim 1, wherein the element is adapted to reproduce an image with a larger field-of-view on said out-coupling means than the field-of-view of any of said image segments.

8. The element according to claim 1, wherein said at least two in-coupling gratings are laterally separated by a distance, which is
   50% or less of a corresponding dimension the out-coupling grating, such as 0-15 mm, and typically located laterally central along said dimension or in the corner area of the lightguide means,
   more than 50% of a corresponding dimension the out-coupling grating, such as 15-50 mm, and typically in the vicinity of opposite corners of the lightguide means along said dimension.

9. A personal display device, in particular a near-to-eye display, wherein the device comprises:
   a multi-pupil lightguide element according to claim 1 for producing an image viewable by the naked eye on the out-coupling means thereof, and
   a multi-pupil projector capable of projecting at least two different image segments of said image on said at least two in-coupling gratings.

10. The device according to claim 9, wherein the projector comprises a display panel whose different zones are utilized for producing said different image segments.

11. The device according to claim 9, wherein said projector is adapted to produce the image on said display panel such that said image segments are in laterally shifted configuration in at least one lateral dimension of the display panel, the segments optionally being separated by a black separating zone for preventing cross-talk between the segments in said projector or on said multi-pupil lightguide element.

12. The device according to claim 9, wherein the projector comprises a plurality of display panels that are utilized for producing said different image segments.

13. The device according to claim 9, wherein the out-coupling gratings comprise grating lines oriented in horizontal direction or in vertical direction.

14. The device according to claim 9, wherein the projector is a projector comprising:
   at least one display element for displaying an image,
   at least two exit pupils, and
   optical means for projecting at least two different segments of said image to said at least two exit pupils, respectively,
wherein said display element comprises a non-polarized light source and means for utilizing two different polarization states of said light source for projecting said image segments to said exit pupils.

15. A multi-pupil projector for a diffractive personal display, comprising:
   at least one display element for displaying an image,
   at least two exit pupils, and
   optical means for projecting at least two different segments of said image to said at least two exit pupils, respectively, wherein said display element comprises a non-polarized light source and means for utilizing two different polarization states of said light source for projecting said image segments to said exit pupils.

16. The multi-pupil projector according to claim 15, wherein the display element comprises a liquid crystal on silicon (LCOS) display panel or the like and an illumination system comprising at least two polarizing beam splitters arranged in sequence for utilizing two different polarization states of light for projecting said at least two different image segments.

17. The multi-pupil projector according to claim 15, wherein said optical means comprises two successive beam splitters, such as beam splitter cubes or plates, having perpendicular polarization orientations.

18. The multi-pupil projector according to claim 15, wherein said optical means comprise two successive beam splitters, such as beam splitter cubes or plates, having the same polarization orientation and a half-wavelength waveplate arranged optically between the beam splitters.

19. A method for displaying image on a personal display device, the method comprising:
projecting at least two different partial image segments of a total image on at least two diffractive in-coupling gratings laterally displaced from each other on a lightguide means, the in-coupling gratings coupling said image segments to the lightguide means, and
guiding the image segments to at least one diffractive out-coupling grating for reproducing said total image from said image segments,
wherein the image segments are guided to said at least one out-coupling grating via exit pupil expander gratings, the exit pupil expander gratings being associated with and arranged optically between at least one of said in-coupling gratings and said at least one out-coupling grating for extending the exit pupil of the element, and
wherein said in-coupling gratings and exit pupil expander gratings are located such that a first in-coupling grating associated with a first exit pupil expander grating laterally overlaps with a second exit pupil expander grating associated with a second in-coupling grating.

20. The method according to claim 19, wherein the image segments are guided to at least two out-coupling gratings being laterally overlapping each other on said lightguide means for reproducing said total image from said image segments.

21. The method according to claim 19, wherein the different image segments carry a different field-of-view of the total image.

22. The method according to claim 19, wherein the different image segments are guided on different lightguide layers stacked on top of each other and each comprising an in-coupling gratings and an out-coupling grating optically associated with the in-coupling grating, and an exit pupil expander grating arranged optically between in the in-coupling and associated out-coupling grating.

* * * * *